(12) United States Patent
Akselrod

(10) Patent No.: US 11,768,271 B2
(45) Date of Patent: Sep. 26, 2023

(54) WAVEGUIDE-INTEGRATED TUNABLE LIQUID CRYSTAL METASURFACE DEVICES

(71) Applicant: Lumotive, Inc., Redmond, WA (US)

(72) Inventor: Gleb M. Akselrod, Kenmore, WA (US)

(*) Notice: Subject to any disclaimer, the term of this patent is extended or adjusted under 35 U.S.C. 154(b) by 647 days.

(21) Appl. No.: 16/829,387

(22) Filed: Mar. 25, 2020

(65) Prior Publication Data

US 2020/0371210 A1 Nov. 26, 2020

Related U.S. Application Data

(60) Provisional application No. 62/934,520, filed on Nov. 13, 2019, provisional application No. 62/852,007, filed on May 23, 2019.

(51) Int. Cl.
| | | |
|---|---|---|
| *G01S 7/481* | (2006.01) | |
| *G02F 1/31* | (2006.01) | |
| *G01S 17/08* | (2006.01) | |
| *G01S 7/483* | (2006.01) | |
| *G01S 7/484* | (2006.01) | |
| *G01C 3/00* | (2006.01) | |
| *G01C 3/08* | (2006.01) | |

(52) U.S. Cl.
CPC .......... G01S 7/4811 (2013.01); G01S 7/4814 (2013.01); G01S 7/4816 (2013.01); G01S 7/4817 (2013.01); G01S 17/08 (2013.01); G02F 1/31 (2013.01); *G01C 3/00* (2013.01); *G01C 3/08* (2013.01); *G01S 7/483* (2013.01); *G01S 7/484* (2013.01); *G02F 2203/24* (2013.01)

(58) Field of Classification Search
CPC .... G01S 7/4811; G01S 7/4814; G01S 7/4816; G01S 7/4817; G01S 17/08; G01S 7/483; G01S 7/484; G02F 1/31; G02F 2203/24; G01C 3/00; G01C 3/08
See application file for complete search history.

(56) References Cited

U.S. PATENT DOCUMENTS 5,999,282 A * 12/1999 Suzuki .............. G02F 1/133621
349/5
11,194,087 B1 * 12/2021 Greif .................. G02B 27/0172
(Continued)

*Primary Examiner* — Isam A Alsomiri
*Assistant Examiner* — Joseph C Fritchman
(74) *Attorney, Agent, or Firm* — PCFB, LLC; Justin K. Flanagan

(57) ABSTRACT

Optical receivers and transmitters can be used as stand-alone systems or combined together as a transceiver. Each of the receiver and transmitter may include an optically reflective steerable device, such as an optically reflective liquid crystal metasurface (LCM), to steer optical radiation to a target location. A transmit waveguide conveys optical radiation from a light source to the transmitter steerable device. A receive waveguide conveys received optical radiation reflected by the receiver optically steerable device to a sensor. In some embodiments, the transmit waveguide and the receive waveguide may be portions of the same planar waveguide. The receiver includes a holographic lens between the receiver LCM and the receive waveguide to pass through optical radiation received at a first range of incident angles and modify (e.g., collimate and/or spectrally filter) optical radiation reflected by the receiver LCM for conveyance by the receive waveguide to the sensor.

22 Claims, 14 Drawing Sheets

(56) References Cited

U.S. PATENT DOCUMENTS

| | | | | |
|---|---|---|---|---|
| 2002/0093701 A1* | 7/2002 | Zhang | ............... | G02C 7/043 |
| | | | | 359/15 |
| 2014/0140654 A1* | 5/2014 | Brown | ............... | G02B 5/1814 |
| | | | | 385/10 |
| 2015/0289762 A1* | 10/2015 | Popovich | ............... | G02B 6/4287 |
| | | | | 351/209 |
| 2018/0190015 A1* | 7/2018 | Chen | ............... | G01S 7/4816 |
| 2018/0239021 A1* | 8/2018 | Akselrod | ............... | G02F 1/0107 |
| 2019/0086518 A1* | 3/2019 | Hallstig | ............... | G01S 7/4863 |
| 2020/0310120 A1* | 10/2020 | Grief | ............... | G02B 19/0057 |

\* cited by examiner

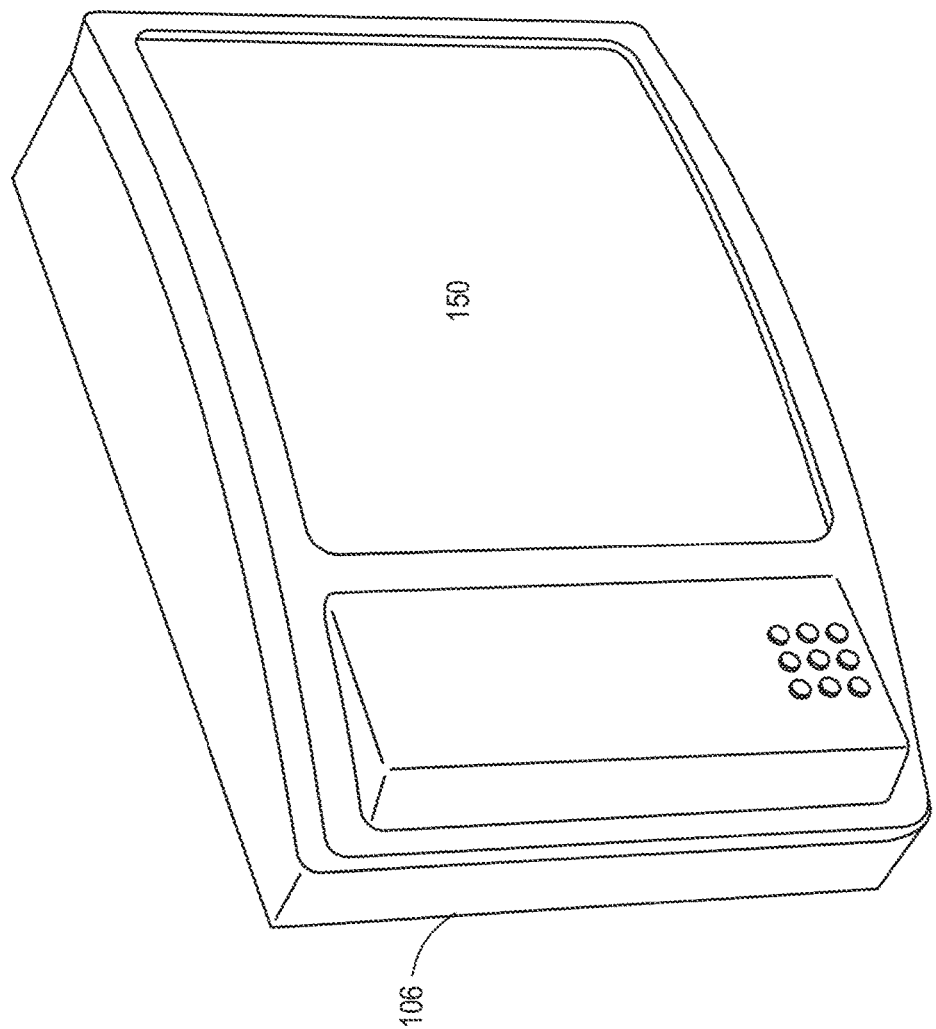

US 11,768,271 B2

WAVEGUIDE-INTEGRATED TUNABLE LIQUID CRYSTAL METASURFACE DEVICES

RELATED APPLICATIONS

This application claims priority under 35 U.S.C. § 119 to U.S. Provisional Patent Application No. 62/852,007 titled "Waveguide-Integrated Tunable Liquid Crystal Metasurface Devices," filed on May 23, 2019 and to U.S. Provisional Patent Application No. 62/934,520 titled "Side-Lobe Suppression In Optical Metasurface Devices," filed on Nov. 13, 2019, which applications are hereby incorporated by reference in their entireties to the extent they are not inconsistent herewith.

TECHNICAL FIELD

This disclosure relates to optical resonators, liquid crystal-based metasurfaces, and optical waveguides. Specifically, this disclosure relates to tunable antenna systems for transmitting and receiving optical radiation.

BRIEF DESCRIPTION OF THE DRAWINGS

FIG. 1B illustrates an example of a solid-state LiDAR system utilizing optical waveguides, as described herein, to reduce at least one dimension of the solid-state LiDAR system, according to one embodiment.

DETAILED DESCRIPTION

Figure 1A:
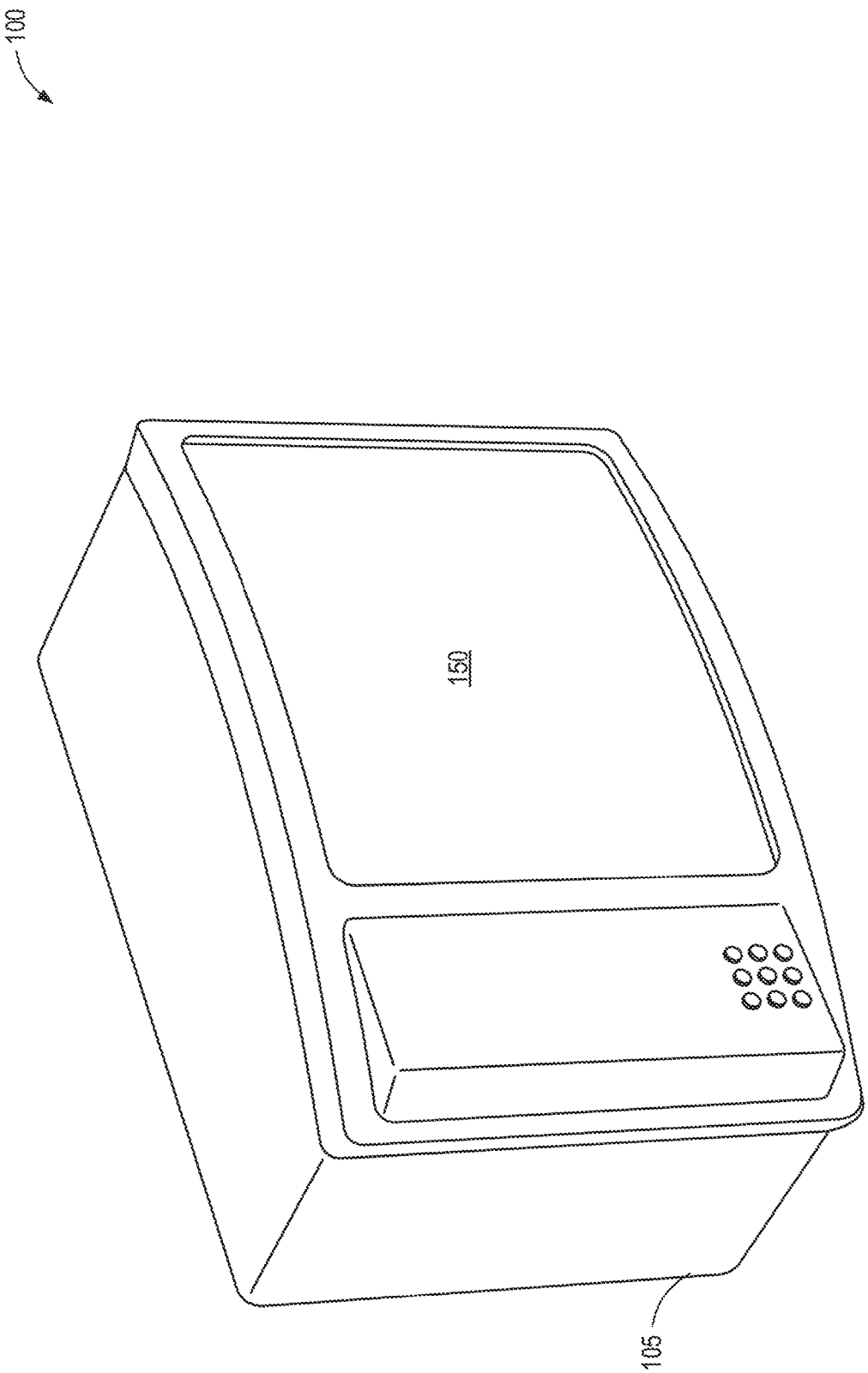
FIG. 1A illustrates an example of a solid-state LiDAR system, according to one embodiment.

Various embodiments of waveguide-integrated tunable liquid crystal metasurface devices are described herein, including transmitters, receivers, and combinations thereof (transceivers). Waveguide-integrated tunable liquid crystal metasurface devices may be used for data transfer, wireless power transfer, optical imaging, and the like. For example, waveguide-integrated tunable liquid crystal metasurface devices may be used for light detection and ranging (LiDAR).

In some embodiments, a LiDAR transceiver system may include a tunable optically reflective liquid crystal metasurface (LCM) to steerably reflect optical radiation generated by a light source to a target location (a transmit LCM) and a tunable, optically reflective LCM receiver to steerably receive optical radiation rebounded from the target location (a receive LCM). The transmit LCM may receive optical radiation from a light source via a transmit optical waveguide.

The receive LCM may be coupled to a sensor via a receive optical waveguide. In some embodiments the receive optical waveguide and the transmit optical waveguide may be independent, separate waveguides. In other embodiments, a single planar waveguide may serve as both the transmit optical waveguide and receive optical waveguide. For example, the transmit optical waveguide and the receive optical waveguide may represent different physical optical paths within a single common waveguide.

In various embodiments, a receiver holographic lens may couple the receive LCM to the receive optical waveguide. Optical radiation rebounding from a target location is incident on the receiver holographic lens at angles corresponding to the steering angles of the receive LCM. At angles of incidence within the range of angles corresponding to the steering angles, the optical radiation passes through the receiver holographic lens. The phrase "pass through" is used herein to refer to limited or no wavelength filtering and/or collimating or another focusing. Optical radiation "passed through" the receiver holographic lens may, in some embodiments, be uniformly refracted prior to being reflected by the receive LCM.

The optical radiation reflected by the receive LCM is incident on the receiver holographic lens at an angle of incidence outside the range of steering angles of the receive LCM receiving optical radiation rebounded from a target location. At angles of incidence in this second range of angles of incidence, the receiver holographic lens modifies the reflected optical radiation prior to conveyance through the receive optical waveguide to the sensor (e.g., an array of sensors or array of detectors, such as photodiodes).

Because the waveguide is positioned on top of the receive LCM, the waveguide is selected to be optically transparent at the steering angle of the device (e.g., for a free space steering range of plus or minus approximately 60 degrees in air, or approximately 38 degrees in glass). Likewise, the holographic lens between the waveguide and the receive LCM comprises a distribution of refractive indices with a thickness selected to be effectively transparent for optical radiation within the steering range.

At angles greater than the steering angle, the holographic lens may be programmed to modify the optical radiation through selective refraction, collimation, and/or spectral filtering. The holographic lens may have a spectral bandwidth of, for example, less than 1 nm to filter out noise, such as solar light and optical radiation other than that generated by a corresponding transmit LCM. The holographic lens focal length may, for example, be between 50 and 75 mm in various embodiments. More compact designs are possible with shorter focal lengths, but maintaining optical transparency of the optical waveguide for angles within the steering angle of the device may dictate minimum focal lengths for a given operational bandwidth.

The LiDAR system may transmit optical radiation to the target location that has a relatively narrow bandwidth (e.g., 905 nm or 1550 nm optical radiation from a narrow-band laser diode). The receiver LCM may be tuned (e.g., steered) to receive rebounded optical radiation from the target location; however, optical radiation at other wavelengths (noise) may also be received by the receiver LCM. For example, sunlight and optical radiation from other sources may rebound from the target location or originate from the direction of the target location and be incident on the receiver LCM.

The receiver holographic lens passes the rebounded optical radiation, the noise, and optical radiation from other angles of incidence corresponding to steering angles of the receiver LCM through to the receiver LCM. The receiver LCM is tuned to reflect optical radiation from a specific steering angle to a sensor. The reflected optical radiation at the selected steering angle is incident on the receiver holographic lens at angles of incidence that result in modification to the reflected optical radiation prior to conveyance of the optical radiation by the receive optical waveguide to the sensor.

For example, the receiver holographic lens may modify the reflected optical radiation by filtering out wavelengths such as those other than the relatively narrow bandwidth of the transmitted optical radiation (e.g., the 905 nm or 1550 nm), collimate the reflected optical radiation for conveyance through the receive optical waveguide to an aperture of the sensor (e.g., a sensor array), and/or otherwise couple the reflected optical radiation from the selected steering angle through the receive optical waveguide to the aperture of the sensor.

In many of the embodiments and examples described herein, a tunable, optical LCM is used to steerably transmit and/or receive optical radiation. However, it is appreciated that alternative optically steerable devices may be used to steerably receive and/or transmit optical radiation. For example, a moveable microelectromechanical (MEM) device may be used in place of a tunable LCM. One or more optical waveguides may couple a laser to a transmit optically steerable device and a sensor to a receive optically steerable device. A holographic lens may couple the transmit optically steerable device to an optical waveguide and spectrally filter the optical radiation, collimate the optical radiation, focus the optical radiation, and/or otherwise modify the optical radiation.

In many embodiments, tunable optical metasurfaces, such as tunable, optically reflective LCMs, include optically reflective surfaces. An optically reflective surface may be a metal surface selected to reflect optical radiation within a specific bandwidth. A large number of optical resonant antennas may be positioned on the reflective surface. The optical resonant antennas may have sub-wavelength features and be arranged with sub-wavelength spacing. For example, the individual optical resonant antennas and the spacings therebetween may be less than one-half of a wavelength.

In various embodiments, liquid crystal may be positioned around the optical resonant antennas, as a layer on top of the optical resonant antennas, and/or as part of the optical resonant antennas. A digital or analog controller may selectively apply varying voltage differentials across the liquid crystal within optical field regions of each of the optical resonant antennas. The voltage controller may apply a voltage differential bias pattern, such as a grating pattern (e.g., a blazed grating pattern), to the metasurface to attain a target beam steering angle.

A one-dimensional voltage bias pattern may be applied to liquid crystal within the optical field regions of a one-dimensional array of optical resonant antennas to effectuate one-dimensional beam steering. A two-dimensional voltage bias pattern may be applied to liquid crystal within the optical field regions of a two-dimensional array of optical resonant antennas to effectuate two-dimensional beam steering and/or spatial beamforming. One-dimensional beam steering, two-dimensional beam steering, and spatial beamforming are generally referred to herein as being encompassed by the term "beamforming."

The metasurface may have a default reflection angle or reflection pattern based on the reflective properties of the optically reflective surface, the unbiased optical resonant antennas, and the unbiased liquid crystal. In various embodiments, biasing the liquid crystal changes the reflection phase of the optical radiation proximate the associated optical resonant antennas. Each different voltage pattern across the metasurface corresponds to a different reflection phase pattern. With a one-dimensional array of optical resonant antennas, each different reflection phase pattern corresponds to a different steering angle in a single dimension. With a two-dimensional array of optical resonant antennas, each different reflection phase pattern may correspond to a different two-dimensional beam steering angle. Alternatively, each different reflection pattern may be used to effectuate a unique spatial beam form.

A wide variety of shapes, sizes, materials, configurations, and the like may be utilized. Optical resonant antennas may, for example, be formed as metal rails extending from the optically reflective surface. In some embodiments, a deposit of liquid crystal may fill part of each channel between adjacent optical resonant antennas. In other embodiments, the liquid crystal may be formed as a layer on top of the optical resonant antennas that fills the channels therebetween.

A voltage controller may apply a voltage pattern to the metal rails to bias the liquid crystal associated therewith to attain a target reflection phase pattern. In embodiments in which the optically reflective surface is metal and the optical resonant antennas are metal, a dielectric or another insulator may separate the metal surface and the optical resonant antennas. The voltage controller may be connected to the metal rails via contacts around a perimeter of the metasurface or via insulated thru-bores in the metal surface.

Copper is an example of a metal suitable and cost-effective for infrared bandwidths commonly used for light detection and ranging, or LiDAR, such as 905-nanometer LiDAR systems and 1550-nanometer LiDAR systems. Copper may also be used for a variety of other operational wavelengths, and alternative metals (e.g., gold, silver, aluminum, etc.) and various dielectrics and metal-coated dielectrics are known to be highly reflective at various wavelengths. It is appreciated that some materials, as known in the art, may be preferred for visible wavelengths, other materials may be more suitable for ultraviolet wavelengths, and still other materials may be more suitable for infrared wavelengths.

A specific example of an optically reflective LCM includes a planar copper reflector covered with silicon dioxide. Between 10,000 and 100,000 copper rails extend from the silicon dioxide-covered copper reflector. The copper rails are subdivided into subsets of copper rails. Each subset of copper rails includes between 100 and 10,000 copper rails. The tunable, optical metasurface may include a number of electrical contacts equal to the number of copper rails in each subset.

For example, each subset may include 1,000 rails and the tunable, optical metasurface may include 50 subsets for a total of 50,000 metal rails. The tunable, optical metasurface may include 1,000 electrical contacts. Each electrical contact may be connected to one rail within each subset.

Liquid crystal deposited between the metal rails may be secured via an optically transparent cover (e.g., glass). The application of a voltage pattern to the 1,000 electrical contacts via a voltage controller results in a voltage differential bias pattern being applied to the liquid crystal that changes the local reflection phase thereof. A beam steering controller selects a voltage pattern corresponding to a reflection phase pattern of a target beam steering angle. By modifying the applied voltage, incident optical radiation can be steered in one direction. Similar embodiments using columns or pillars instead of elongated metal rails may be used to allow for two-dimensional beam steering or spatial beamforming.

Various combinations of the embodiments and features described above may be used to manufacture and/or operate a solid-state light detection and ranging (LiDAR) transmitter, receiver, or transceiver system. The transceiver system, according to various embodiments, may include a first tunable, optically reflective LCM for transmitting laser light and a second tunable, optically reflective LCM for receiving laser light reflected by distant objects (rebounded light). The distance to the distant objects can be calculated by measuring the time-of-flight of the transmitted and rebounded light.

The optical transceiver systems described herein may be used for LiDAR with a laser diode light source for transmissions, such as a laser diode emitting optical radiation at standardized wavelengths of 905 nanometers or 1550 nanometers. Various other wavelengths may be utilized with the systems and methods described herein, including visible wavelengths, sub-infrared wavelengths, and infrared wavelengths. The LiDAR system may include a receiver to reflect rebounded optical radiation to a receiving sensor (such as an avalanche photodiode array) from a target steering angle or beam shape (e.g., corresponding to the transmitted steering angle or beam shape).

It is appreciated that the metasurface technologies described herein may incorporate or otherwise leverage prior advancements in surface scattering antennas, such as those described in U.S. Patent Publication No. 2012/0194399, which publication is hereby incorporated by reference in its entirety. Additional elements, applications, and features of surface scattering antennas that feature a reference wave or feed wave are described in U.S. Patent Publication Nos. 2014/0266946, 2015/0318618, 2015/0318620, 2015/0380828, 2015/0162658 and 2015/0372389, each of which is hereby incorporated by reference in its entirety. Specific descriptions of optical resonant antenna configurations and feature sizes are described in U.S. patent application Ser. Nos. 15/900,676, 15,900,683, and 15/924,744, each of which is hereby incorporated by reference in its entirety to the extent they are not inconsistent herewith.

Throughout this disclosure, examples of transmitting (or receiving) embodiments are provided with the understanding that reciprocal receiving (or transmitting) embodiments are also contemplated. Similarly, it is understood that a system may operate as only a transmitter, only a receiver, simultaneously as a transmitter and receiver, with a time-multiplexed transmitter/receiver, and/or with the first metasurface acting as a transmitter and a second metasurface acting as a receiver.

Many prior advancements in surface scattering antennas have focused on relatively low frequencies (e.g., microwave and RF bands). The presently described embodiments support optical bandwidths and are therefore suitable for LiDAR and other optical-based sensing systems. Prior surface scattering antennas suitable for operation with optical bandwidths utilize lenses and mirrors to couple the surface scattering antennas to laser diodes (for transmitting) and sensors (for receiving). Specifically, the systems and methods described herein operate in the sub-infrared, mid-infrared, high-infrared, and/or visible-frequency ranges (generally referred to herein as "optical"). Given the feature sizes needed for sub-wavelength optical resonant antennas and antenna spacings, the described metasurfaces may be manufactured using micro-lithographic and/or nano-lithographic processes, such as fabrication methods commonly used to manufacture complementary metal-oxide-semiconductor (CMOS) integrated circuits.

Some of the infrastructure that can be used with embodiments disclosed herein is already available, such as general-purpose computers, computer programming tools and techniques, digital storage media, and communication links. Many of the systems, subsystems, modules, components, and the like that are described herein may be implemented as hardware, firmware, and/or software. Various systems, subsystems, modules, and components are described in terms of the function(s) they perform because such a wide variety of possible implementations exist. For example, it is appreciated that many existing programming languages, hardware devices, frequency bands, circuits, software platforms, networking infrastructures, and/or data stores may be utilized alone or in combination to implement a specific control function.

It is also appreciated that two or more of the elements, devices, systems, subsystems, components, modules, etc. that are described herein may be combined as a single element, device, system, subsystem, module, or component. Moreover, many of the elements, devices, systems, subsystems, components, and modules may be duplicated or further divided into discrete elements, devices, systems, subsystems, components, or modules to perform subtasks of those described herein. Any of the embodiments described herein may be combined with any combination of other embodiments described herein. The various permutations and combinations of embodiments are contemplated to the extent that they do not contradict one another.

As used herein, a computing device, system, subsystem, module, or controller may include a processor, such as a microprocessor, a microcontroller, logic circuitry, or the like. A processor may include one or more special-purpose processing devices, such as application-specific integrated circuits (ASICs), programmable array logic (PAL), programmable logic array (PLA), programmable logic device (PLD), field-programmable gate array (FPGA), or other customizable and/or programmable device. The computing device may also include a machine-readable storage device, such as non-volatile memory, static RAM, dynamic RAM, ROM, CD-ROM, disk, tape, magnetic, optical, flash memory, or another machine-readable storage medium. Various aspects of certain embodiments may be implemented or enhanced using hardware, software, firmware, or a combination thereof.

The components of some of the disclosed embodiments are described and illustrated in the figures herein to provide specific examples. Many portions thereof could be arranged and designed in a wide variety of different configurations. Furthermore, the features, structures, and operations associated with one embodiment may be applied to or combined with the features, structures, or operations described in conjunction with another embodiment. In many instances, well-known structures, materials, or operations are not shown or described in detail to avoid obscuring aspects of this disclosure. The right to add any described embodiment or feature to any one of the figures and/or as a new figure is explicitly reserved.

The embodiments of the systems and methods provided within this disclosure are not intended to limit the scope of the disclosure but are merely representative of possible embodiments. In addition, the steps of a method do not necessarily need to be executed in any specific order, or even sequentially, nor do the steps need to be executed only once. As previously noted, descriptions and variations described in terms of transmitters are equally applicable to receivers, and vice versa.

FIG. 1A illustrates an example of a solid-state LiDAR system 100, according to one embodiment. The illustrated enclosure 105 is merely an example, and any number of alternative shapes, sizes, styles, etc. are possible. At least one window portion 150 of the enclosure 105 may be optically transparent at the operational wavelengths. In some embodiments, the window portion 150 may be uncovered or generally allow a broad spectrum of optical radiation to enter the enclosure 105. In still other embodiments, the window portion 150 may comprise a filter to spectrally filter some or all electromagnetic radiation that is not within an operational bandwidth.

FIG. 1B illustrates an example of another solid-state LiDAR system 101 with a thinner enclosure 106 that utilizes optical waveguides and a receive holographic lens that couples the receive optical waveguide to the receive LCM. Again, the illustrated enclosure 106 is merely an example, and any number of alternative shapes, sizes, styles, etc. are possible. However, the thinness of the enclosure is attributable to the reduced profile of the optical waveguides as compared to traditional lens and mirror optical paths.

Figure 2:
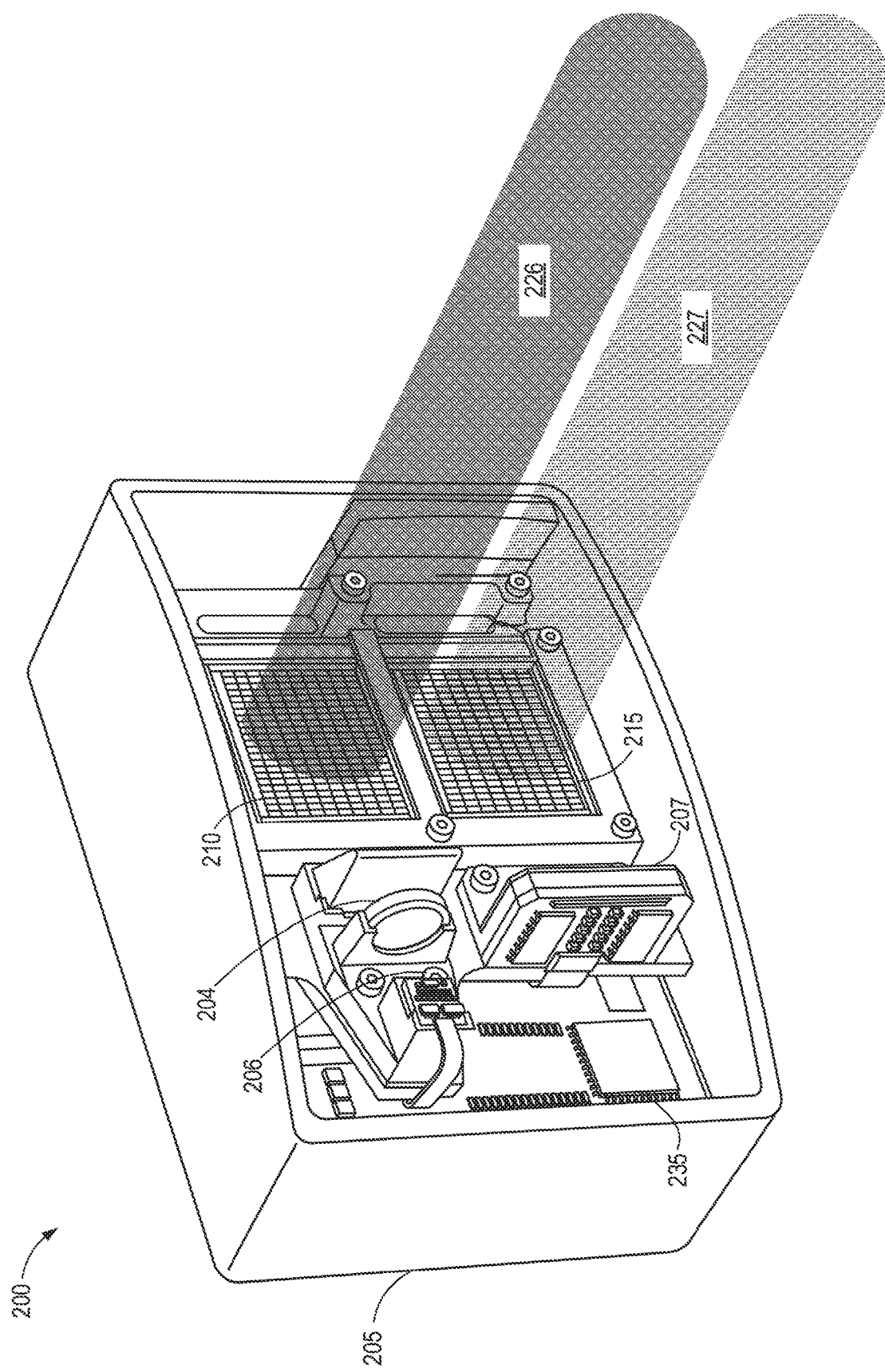
FIG. 2 illustrates a transmit metasurface and a receive metasurface of a lens-based solid-state LiDAR system 200 with one-dimensional beam steering.

FIG. 2 illustrates a transmit metasurface 210 and a receive metasurface 215 of a lens-based solid-state LiDAR system 200 with one-dimensional beam steering. A laser diode 206 (e.g., a 905-nanometer laser diode or a 1550-nanometer laser diode) illuminates the transmit metasurface 210 via collimating/focusing optical elements 204 with optical radiation (not shown for clarity). The optical elements 204 are carefully aligned and oriented to ensure collimating and/or focusing of the optical radiation generated by the laser diode 206 is conveyed to the aperture of the transmit metasurface. The optical radiation incident on the transmit metasurface is reflected from the transmit metasurface as transmitted optical radiation 226. Control circuitry (e.g., microchip 235) tunes optical resonant antennas of the transmit metasurface 210 by applying a voltage differential bias pattern to liquid crystal associated therewith to select a reflection phase pattern corresponding to a target beam steering angle of the reflected optical radiation 226.

Control circuitry 235 also tunes the optical resonant antennas of the receive metasurface 215 by applying a corresponding voltage differential bias pattern to select a reflection phase pattern corresponding to the same target beam steering angle. Transmitted optical radiation 226 rebounds off distant objects and is received as rebounded optical radiation 227 by the receive metasurface 215. Optical radiation 227 received by the receive metasurface 215 is reflected by the metasurface at the target beam steering angle to the receive sensor 207. The receive metasurface 215 may reflect the optical radiation through a spherical lens (not shown) to the receive sensor 207. The receive sensor 207 may be a photodiode array, such as an array of avalanche photodiodes (APDs) or an array of single-photon avalanche diodes (SPADs).

In the illustrated embodiment, the receive sensor 207 is illustrated at suitable steering angle relative to the receive metasurface 215 for the receive metasurface 215 to reflect the rebounded optical radiation 227 to the receive sensor 207. The elevation of the receive sensor 207 relative to the plane of the receive metasurface 215 and the elevation of the optical elements 204 relative to the plane of the transmit metasurface 210 limit the thinness of the enclosure 205.

Figure 3:
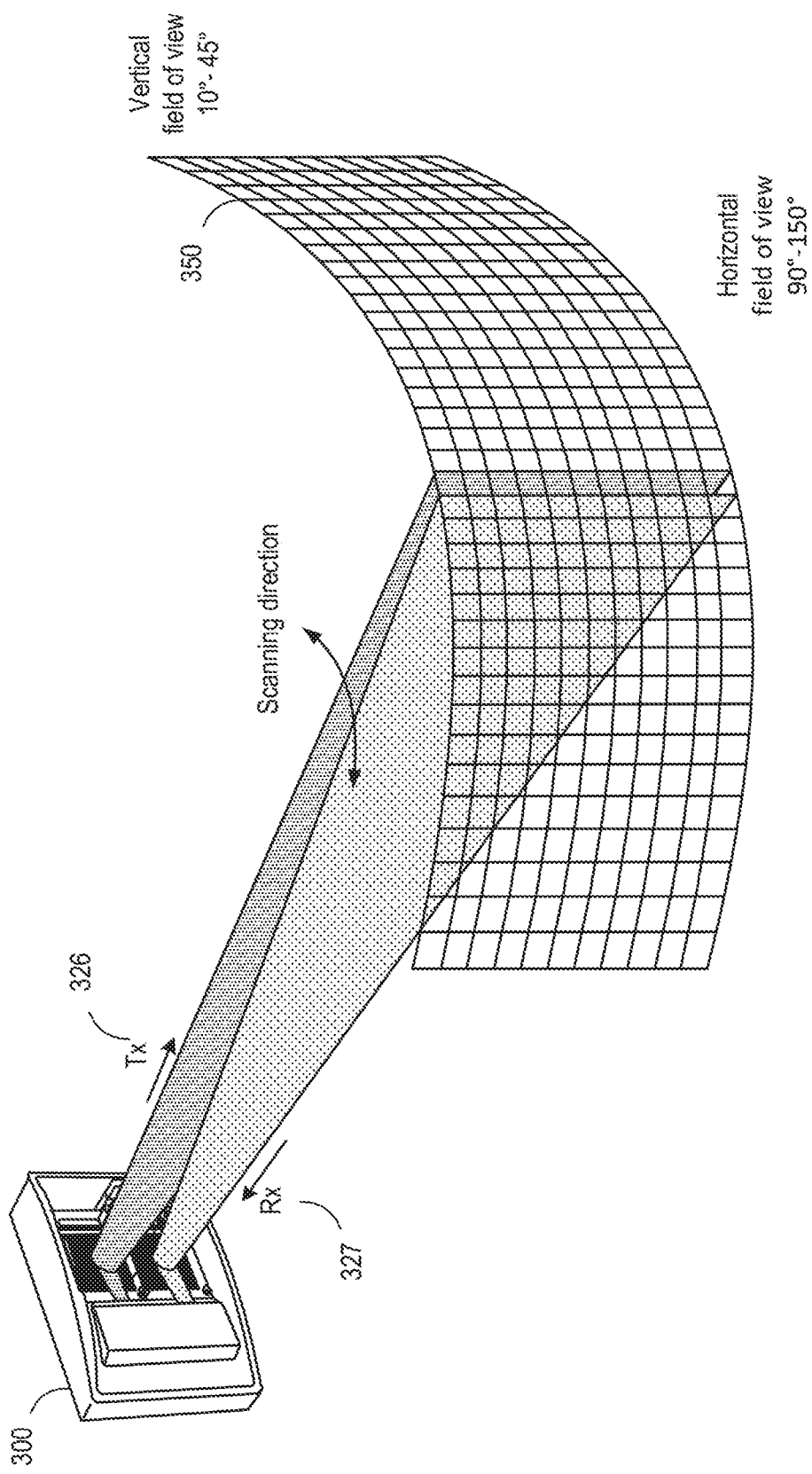
FIG. 3 illustrates an example one-dimensional scan via a solid-state LiDAR system with a relatively thin enclosure housing an optical waveguide tunable liquid crystal LCM, according to various embodiments.

FIG. 3 illustrates an example one-dimensional scan via a solid-state LiDAR system 300 with a relatively thin enclosure housing an optical waveguide tunable LCM, according to various embodiments. As illustrated, the solid-state LiDAR system 300 can implement a one-dimensional scan along a horizontal field of view with a fixed vertical field of view. A transmit metasurface transmits optical radiation 326 with a fixed vertical view (e.g., illustrated as an angle between 10° and 45°) at a first horizontal angle (e.g., illustrated as an angle between 90° and 120°). The transmitted optical radiation 326 is rebounded from distant objects, represented by the plane 350, though it is recognized that the distant objects may be at varying distances from the solid-state LiDAR system 300 and not necessarily in the same plane. In some embodiments, the focal length of the solid-state LiDAR system may vary with steering angle so that the scanning plane 350 is flat instead of curved.

The distant objects rebound the optical radiation as rebounded optical radiation 327. A receive metasurface receives the solid-state LiDAR system 300 at a corresponding horizontal angle and vertical field of view. In various embodiments, and as described herein, the solid-state LiDAR system may scan along the horizontal field of view at various scan angles by modifying the reflection phase patterns of the transmit and receive metasurfaces over a scan time period.

In other embodiments, a LiDAR system may include a tunable transmit metasurface according to any of the embodiments described herein for transmitting beamformed optical radiation. However, instead of using a tunable metasurface to receive rebounded optical radiation, the LiDAR system may include a fixed-focus receiver, a receiver with limited tuning capabilities, and/or one or more omnidirectional receivers. In other embodiments, the LiDAR system may include a tunable receive metasurface according to any of the embodiments described herein, but a more traditional transmitter, such as a fixed-focus transmitter, a limited-focus transmitter, or an omnidirectional transmitter.

In still other embodiments, a system may function as a transmitter only and include a tunable metasurface for transmitting optical radiation, but no corresponding receiver. Similarly, a system may function as a receiver only and include a tunable metasurface for receiving optical radiation, but no corresponding transmitter.

In any of the various embodiments, the optical resonant antennas may be formed as elongated metal rails for one-dimensional beam steering, as illustrated and described. In other embodiments, columns and rows of pillars may be used for two-dimensional beamforming and/or spatial beam shaping. In embodiments for one-dimensional beam steering, each of the optical resonant antennas may comprise a first elongated metal rail that extends up to a height H from the insulator with a defined width W and length L. The proportions of the metal rails may be selected for a particular resonance within an operational wavelength. The elongated metal rails may extend between edges of the underlying reflective surface and may be substantially parallel to one another.

Similarly, in any of the various embodiments, the optical resonant antennas may comprise high-Q adjustable resonant waveguides, such as high-Q adjustable resonant plasmonic waveguides. This high sensitivity to the refractive index of the dielectric is enabled by the high-Q of the resonance (e.g., Q>=10). Any of a wide variety of mathematical models for beam steering may be used, including, for example, the Gerchberg-Saxton algorithm.

Figure 4:
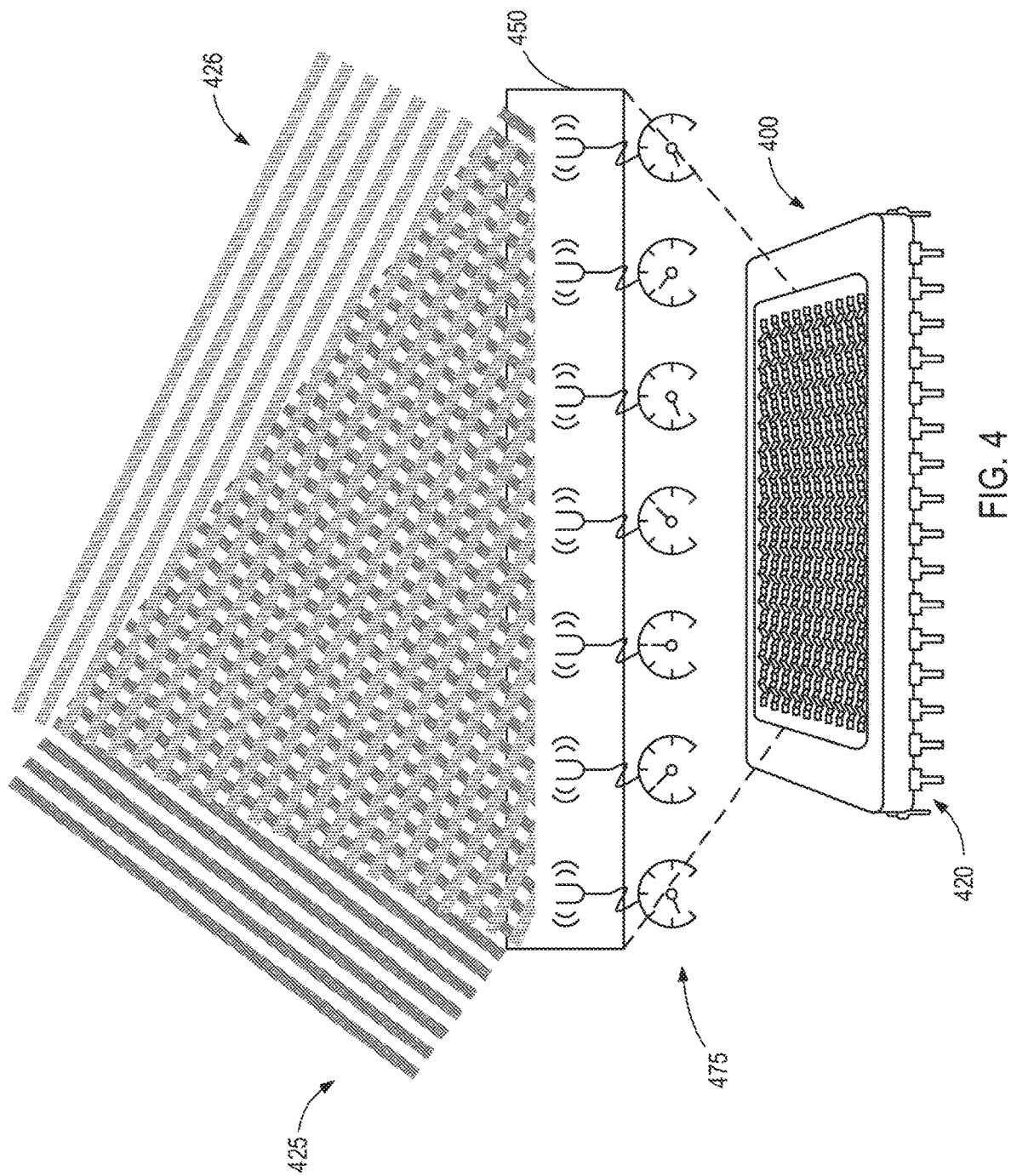
FIG. 4 illustrates the optical radiation reflected at the first steering angle shown as less than 90 degrees relative to the angle of incidence.

FIG. 4 illustrates incident optical radiation 425 reflected as "reflected optical radiation" 426 at an acute angle (i.e., the steering angle is shown as less than 90 degrees relative to the angle of incidence). Modifying the voltages 475 applied to the optical resonant antennas 450 changes the voltage differentials affecting the liquid crystal associated therewith. Each different voltage differential modifies the index of refraction of the liquid crystal and corresponds to a different reflection phase. In a one-dimensional array of elongated rail-type optical resonant antennas 450, as illustrated, each different pattern of reflection phases results in a different beam steering angle.

The illustrated tuning forks in the conceptual block diagram 450' provide a visualization of the functionality of the metasurface 400. As in other embodiments, the optical metasurface may include optical resonant antennas 450 configured as elongated rails arranged in a one-dimensional array. The elongated rails may be connected to a programmable logic controller, CPU, microcontroller, or another controller to selectively apply tuning signals (e.g., a voltage bias pattern) to modify the resonance of the optical resonant antennas 450. Each control pin 420 may allow for a tuning signal to control the resonance of one or more of the optical resonant antennas. Each unique voltage differential bias pattern 475 corresponds to a different radiation pattern (e.g., beam steering, beam shape, amplitude, phase delay, etc.).

Figure 5A:
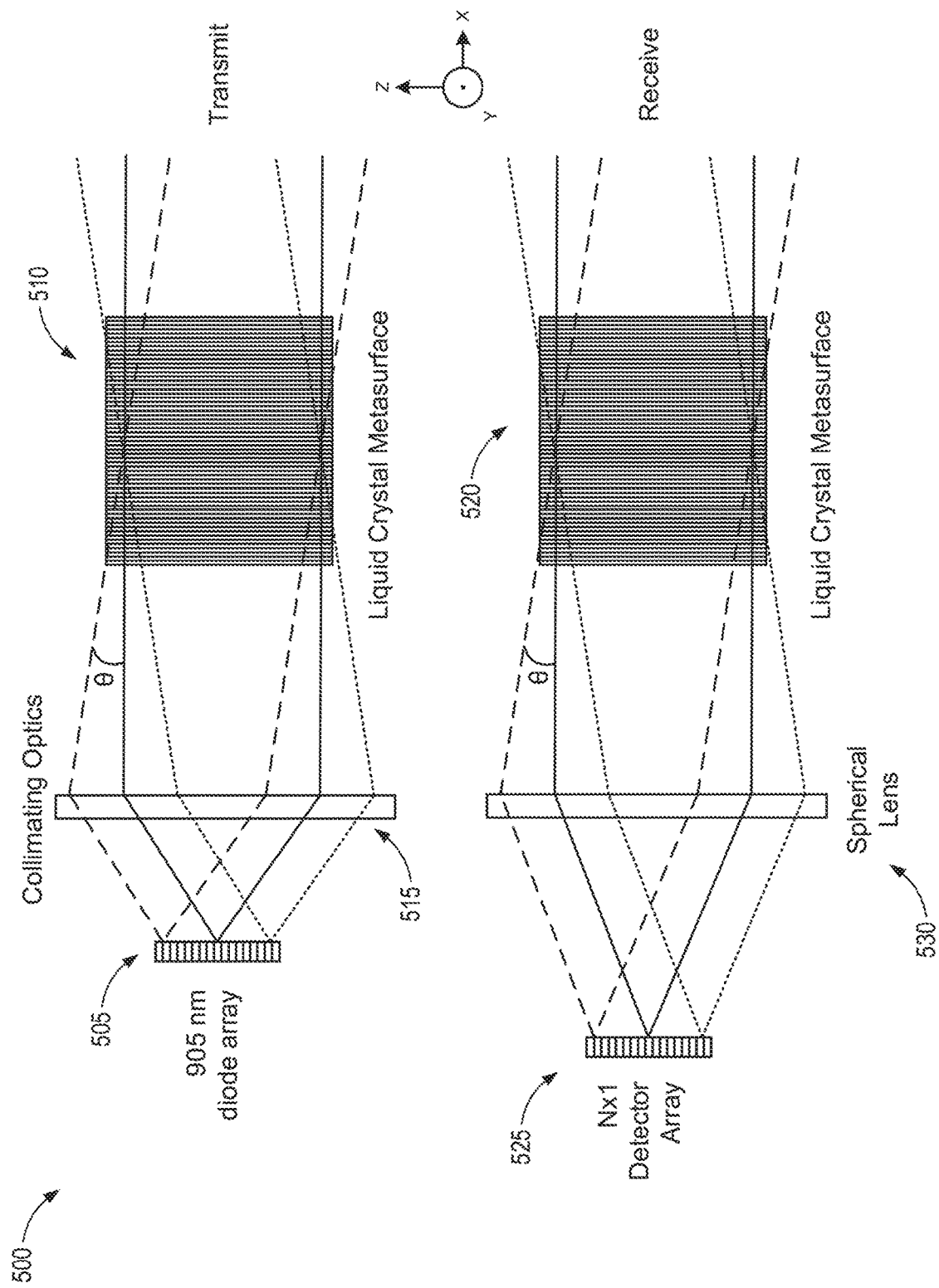
FIG. 5A illustrates a block diagram of a top view of the optical path of a lens-based LCM system.

FIG. 5A illustrates a block diagram of a top view of the optical path 500 of a lens-based LCM transceiver system. In the illustrated embodiment, an array of diodes 505 generates optical radiation at, for example, 905 nm for steerable reflection by an optically reflective LCM 510. Optical elements 515, such as lenses and/or mirrors, are used as part of the optical path to collimate the generated optical radiation to the transmit aperture of the optically reflective LCM 510. The optically reflective LCM 510 is tunably steered to reflect the optical radiation generated by the array of diodes 505 to a target location.

On the receive side of the lens-based LCM transceiver system, an optically reflective LCM 520 receives is tunably steered to receive optical radiation rebounded from the target location. The optically reflective LCM 520 receives the rebounded optical radiation from the target location and reflects it along an optical path to a sensor, such as the illustrated detector array 525. The optical path 500 for the receiver side of the lens-based LCM transceiver system includes a spherical lens 530 to focus the reflected rebounded optical radiation from the receive optically reflective LCM 520. In the illustrated embodiment, different dashed line patterns are used to represent electromagnetic radiation at various angles, θ, orthogonal to the steering direction of the transmit and receive optically reflective LCMs. In a horizontally scanning LCM transceiver system, the angle, θ, represents optical radiation from various angles in the vertical direction corresponding to a fixed vertical field of view.

Figure 5B:
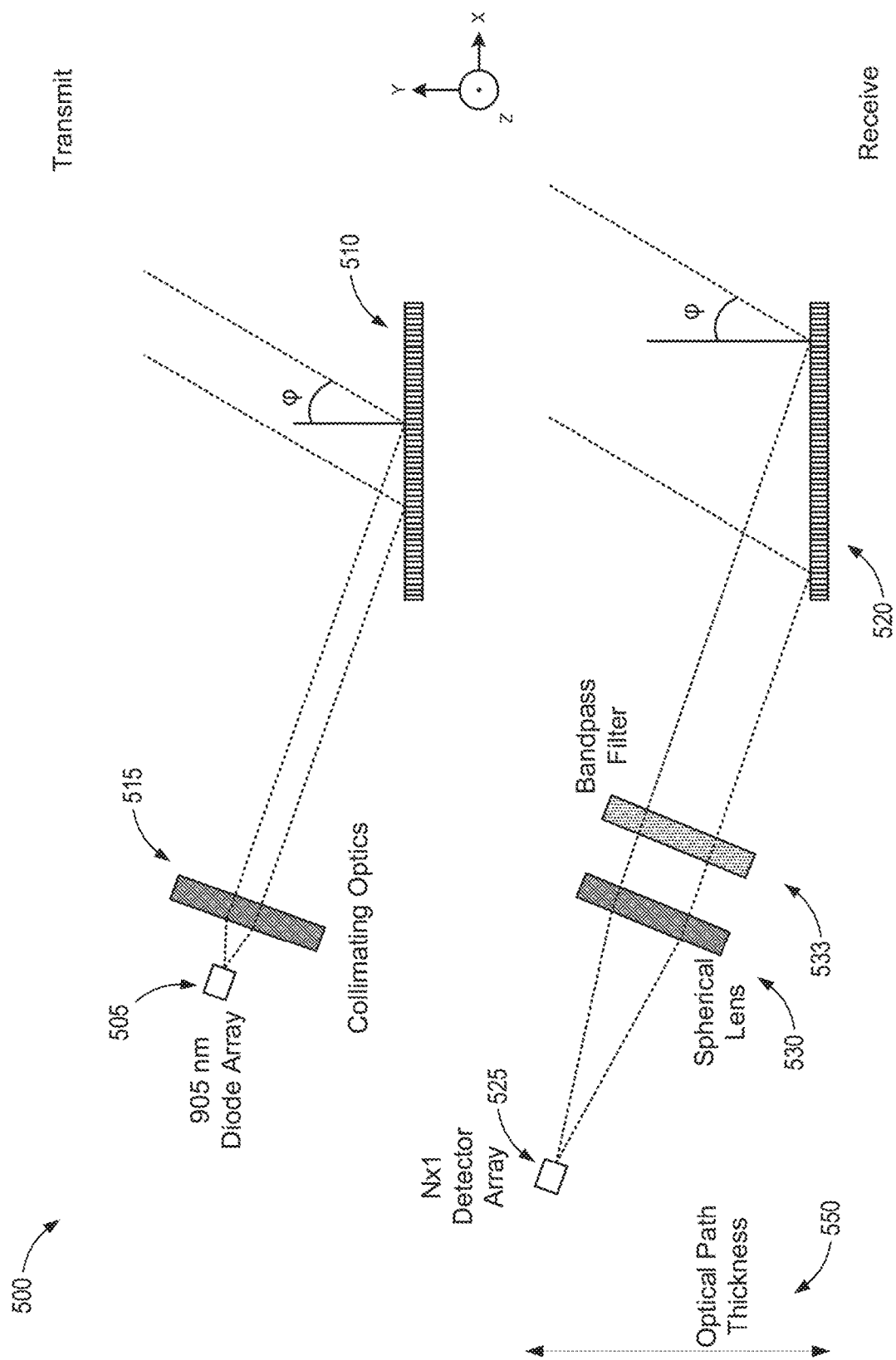
FIG. 5B illustrates a block diagram of a side view of the optical path of a lens-based LCM system.

FIG. 5B illustrates a block diagram of a side view of the same optical path 500 of the lens-based LCM transceiver system of FIG. 5A. Again, the array of diodes 505 generates optical radiation that is collimated by collimating optics 515 for tunable reflection at a steering angle, φ, by the transmit optically reflective LCM 510. The optical radiation is transmitted to a target location where it rebounds back to the lens-based LCM transceiver system. The optically reflective LCM 520 is tunably steered to receive the rebounded optical radiation from the target location at the steering angle, φ.

The rebounded optical radiation is reflected by the optically reflective LCM 520 and passed through a bandpass filter 533 and a spherical lens 530 before being received by the detector array 525. Because the optical path includes optical elements, such as spherical lens 530, bandpass filter 533, and collimating optics 515, the lens-based LCM transceiver has a minimum optical path thickness 550 dictated by these optical elements. Moreover, aligning and positioning these optical elements requires precision manufacturing that can have higher failure rates and/or increased manufacturing costs.

Figure 5C:
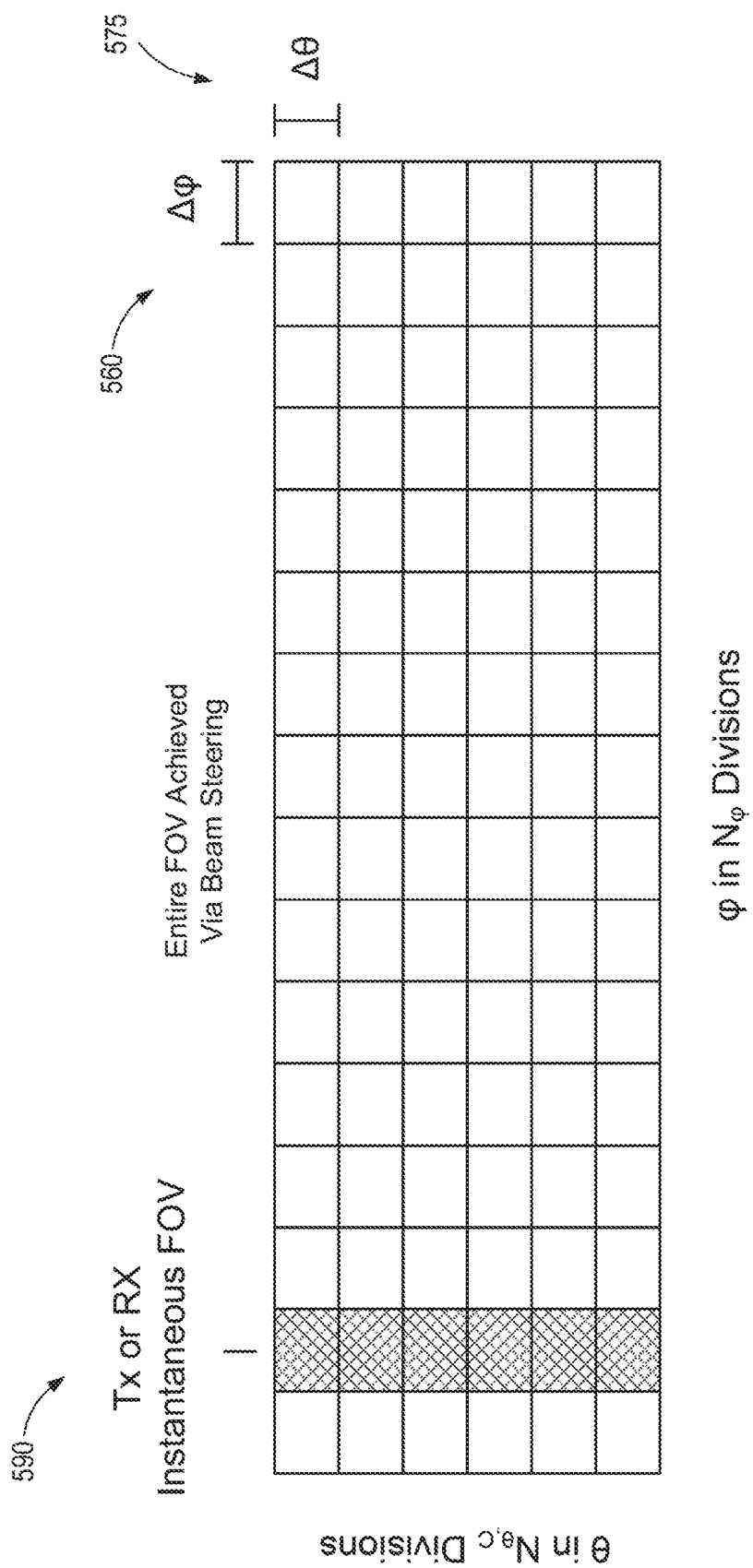
FIG. 5C illustrates the instantaneous vertical field of view scanned horizontally over time to achieve a wide horizontal field of view.

FIG. 5C illustrates the instantaneous vertical field of view 590 of the lens-based optically reflective LCM in FIGS. 5A and 5B with a fixed field of view in the, θ direction 575. The lens-based LCM transceiver system of FIGS. 5A and 5B is tunably steered in the horizontal, φ direction 560. The entire field of view in the φ directions is achieved via Nφ incremental beam steering scans.

FIGS. 5A-5C illustrate the functionality of one-dimensionally steerable lens-based LCM transceiver system with a fixed field of view in the non-steering direction. The lens-based system may be manufactured using expensive and/or complicated techniques to ensure proper lens alignment and positioning. Moreover, with a minimum number of optical elements, the lens-based system is relatively thick. Additional lenses and/or mirrors could possibly be used to reduce the thickness, but the decrease in thickness would come at the cost of and complexity of introducing additional elements that require precise alignment and positioning.

Figure 6:
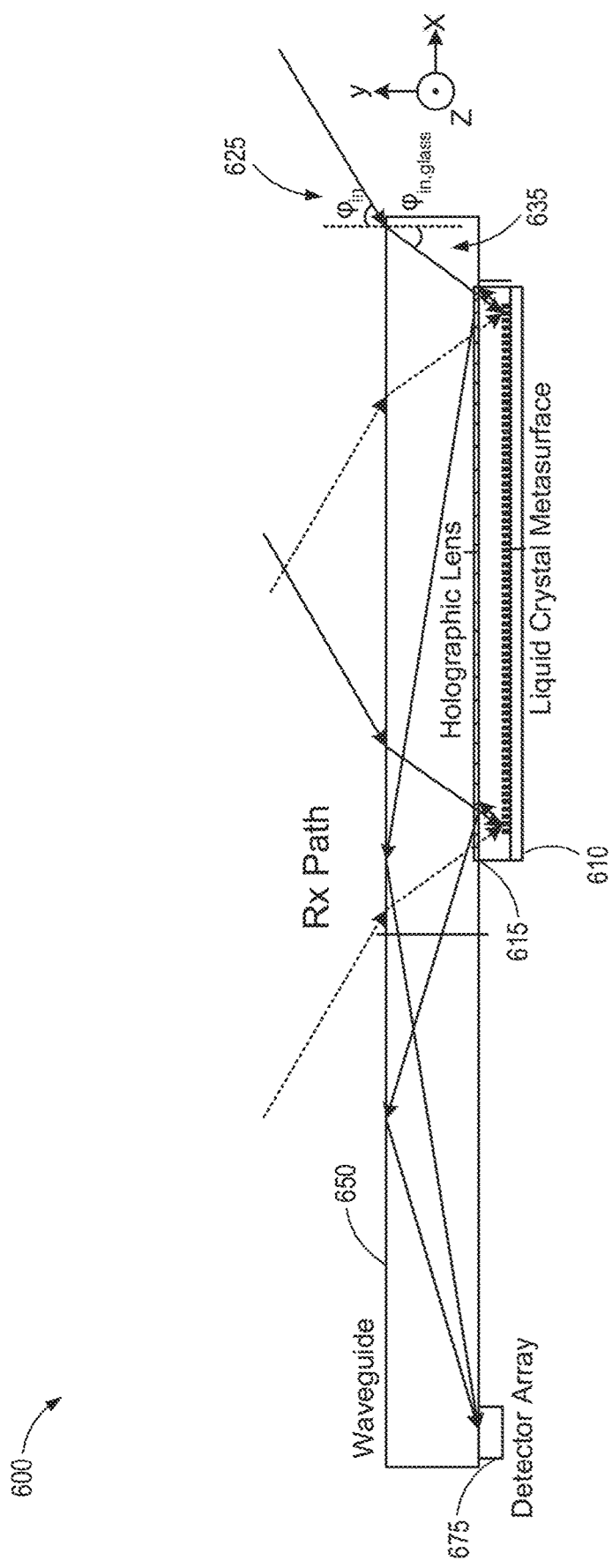
FIG. 6 illustrates a block diagram of a side view of an optical path of an optical waveguide tunable LCM receiver with a holographic lens, according to one embodiment.

FIG. 6 illustrates a block diagram 600 of a side view of an optical path of an optical waveguide tunable LCM receiver 600 with a holographic lens 615, according to one embodiment. In the illustrated embodiment, incident optical radiation (e.g., rebounded optical radiation from a target location) passes through the waveguide 650 with some minor refraction, shown as the difference between the angles $\varphi_{in}$ 625 and $\varphi_{in,glass}$ 635. The optical radiation then passes through the holographic lens without modification to be steerably reflected by the optically reflective LCM 610.

The holographic lens 615 may, for example, comprise a three-dimensional distribution of refractive indices with an optical response dependent on the angle of incidence. For example, the holographic lens 615 may have a first optical response for optical radiation incident within a first range of angles of incidence and a second optical response for optical radiation incident at a second range of angles of incidence.

As a specific example, the holographic lens 615 may pass through optical radiation unmodified that is incident at a range of angles corresponding to the steering angles of the optical waveguide tunable LCM receiver 600. The holographic lens 615 may have a different optical response for optical radiation incident at an angle as reflected by the optically reflective LCM 610. The holographic lens 615 collimates and/or spectrally filters the optical radiation reflected by the optically reflective LCM 610 before being conveyed by the optical waveguide 650 to the detector array 675.

Thus, accordingly to various embodiments, the holographic lens leaves incoming, external optical radiation unmodified while selectively modifying the optical radiation reflected by the optical reflective LCM 610 for reception by the detector array.

Figure 7:
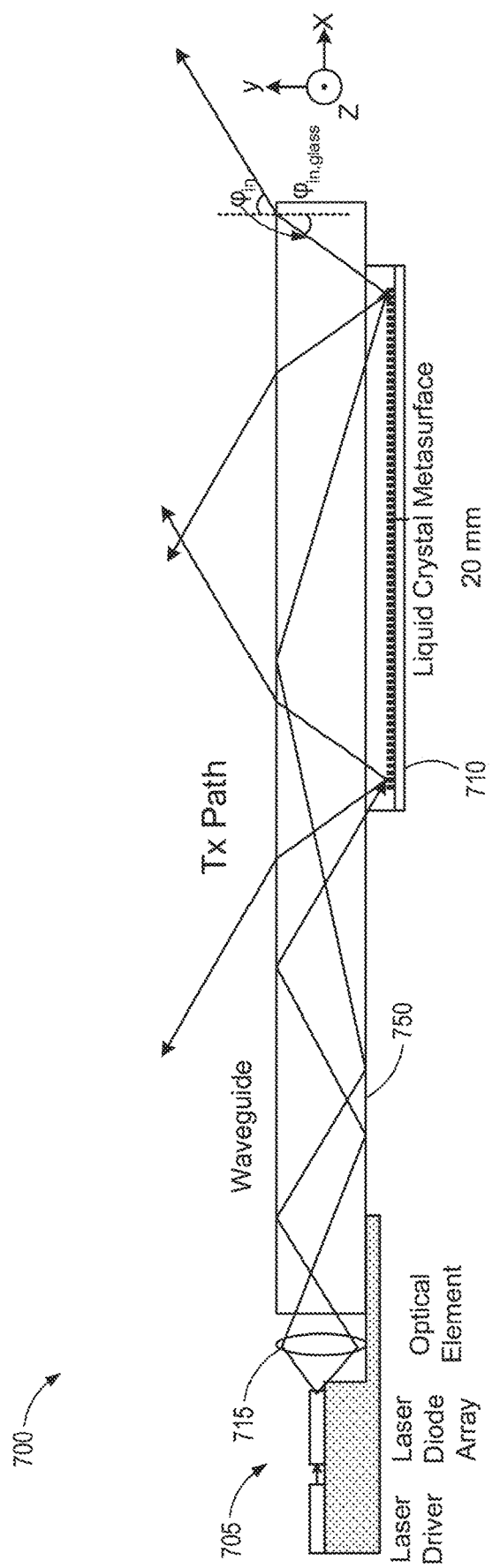
FIG. 7 illustrates a block diagram of a side view of an optical path of an optical waveguide tunable LCM transmitter with collimating optical elements, according to one embodiment.

FIG. 7 illustrates a block diagram of a side view of an optical path of an optical waveguide tunable LCM transmitter 700 with optical element 715, according to one embodiment. In the illustrated embodiment, a laser module 705 comprises a laser driver and laser diode array generates optical radiation. The laser module 705 may, for example, generate narrow-band optical radiation with a wavelength of 705 nm and/or 1550 nm.

The optical element 715 may couple the optical radiation to the optical waveguide 750 to convey the optical radiation from the laser module 705 to the aperture of the optically reflective LCM 710. The optically reflective LCM 710 is selectively tuned (e.g., via voltage controller applying a pattern of differential voltage biases) to reflectively steer the optical radiation to a target location. In the illustrated embodiment, the optically reflective LCM 710 has an aperture of approximately 20 mm. However, alternative sizes, including both larger apertures and smaller apertures, with corresponding physical dimensions, may be used for various applications. Similarly, the thickness of the optical waveguide may be, for example, 4 mm in some embodiments and vary in thickness based on the operation wavelength or range of wavelengths.

Figure 8A:
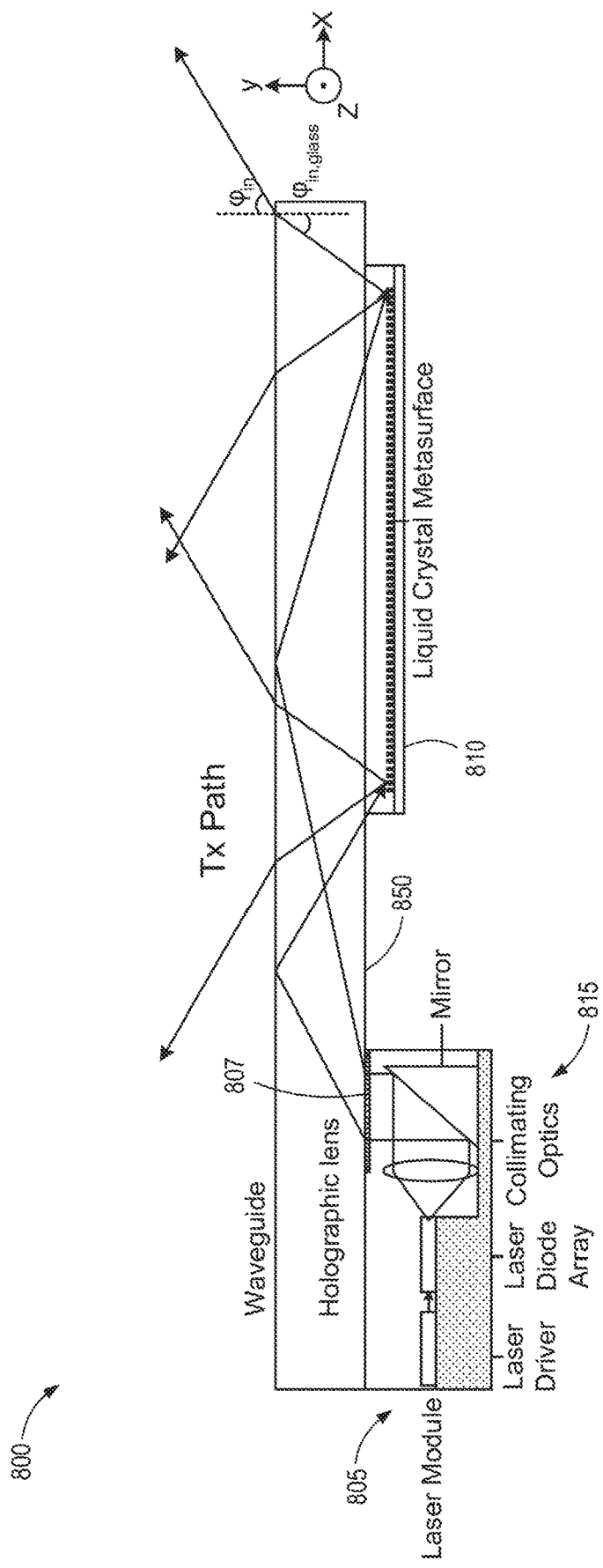
FIG. 8A illustrates a block diagram of a side view of an optical path of an optical waveguide tunable LCM transmitter with a holographic lens, according to one embodiment.

FIG. 8A illustrates a block diagram of a side view of an optical path of an optical waveguide tunable LCM transmitter 800 with a holographic lens 807, according to one embodiment. In the illustrated embodiment, the laser module 805 generates optical radiation that is transmitted through collimating optics 815 that passes through a holographic lens 807 into a waveguide 850. The holographic lens 807 may collimate, disperse, spectrally filter, and/or otherwise modify the optical radiation prior to conveyance through the optical waveguide 850 to the transmit aperture of the optically reflective LCM 810. As in previously described embodiments, the optically reflective LCM 810 is tuned to steer the optical radiation to a target location.

Figure 8B:
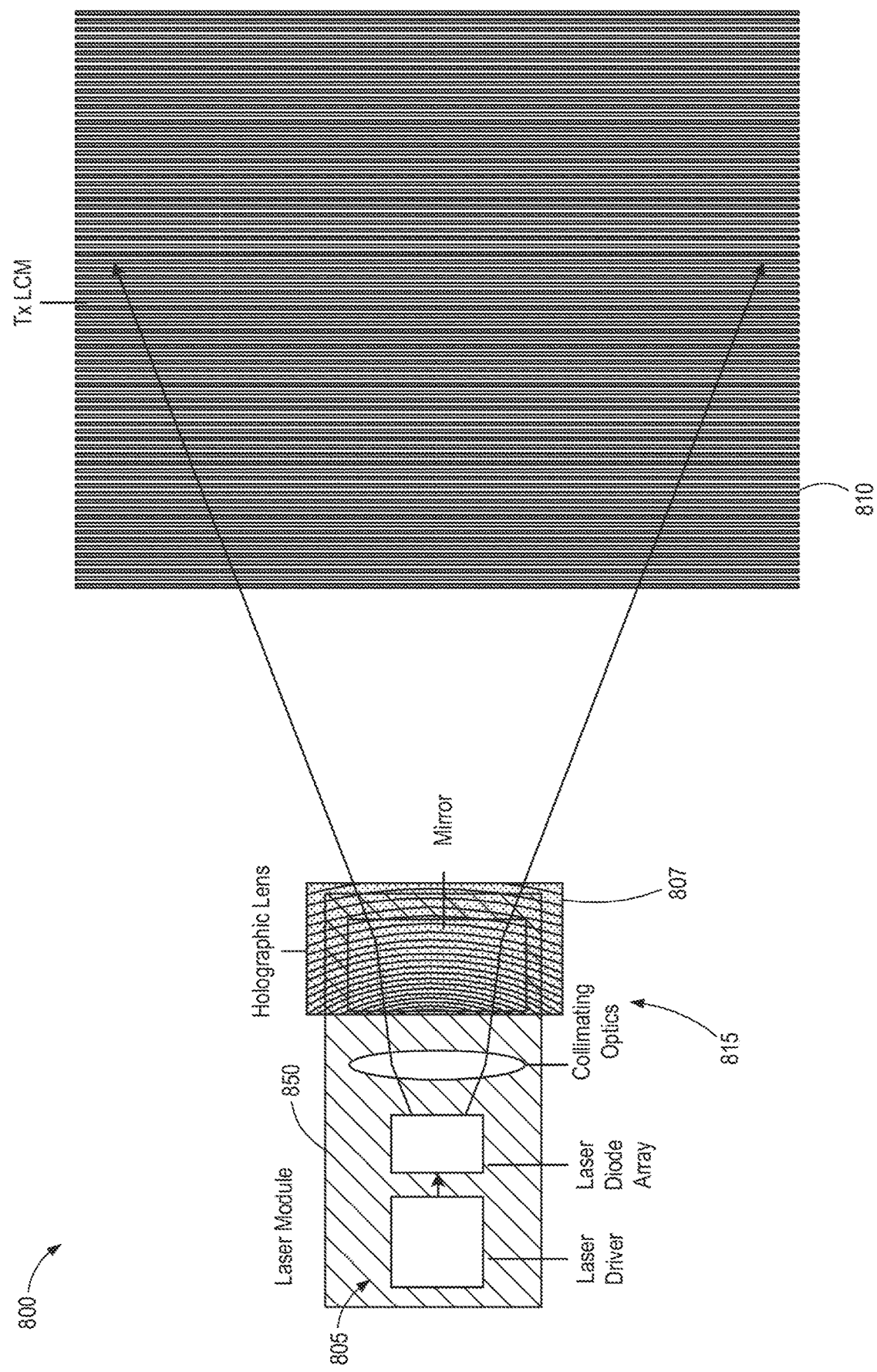
FIG. 8B illustrates a block diagram of a top view of the optical path of the optical waveguide tunable LCM transmitter of FIG. 8A, according to one embodiment.

FIG. 8B illustrates a block diagram of a top view of the optical path of the optical waveguide tunable LCM transmitter 800 of FIG. 8A, according to one embodiment. As illustrated, the collimating optics 815 (e.g., one or more lenses and/or mirrors) refract and/or reflect optical radiation from the laser module 805 to the holographic lens 807. The holographic lens 807 selectively refracts and/or otherwise modifies the optical radiation and couples the modified optical radiation to the optical waveguide (not shown for clarity) for conveyance to the optically reflective LCM 810 for tunable steering to target locations.

Figure 9:
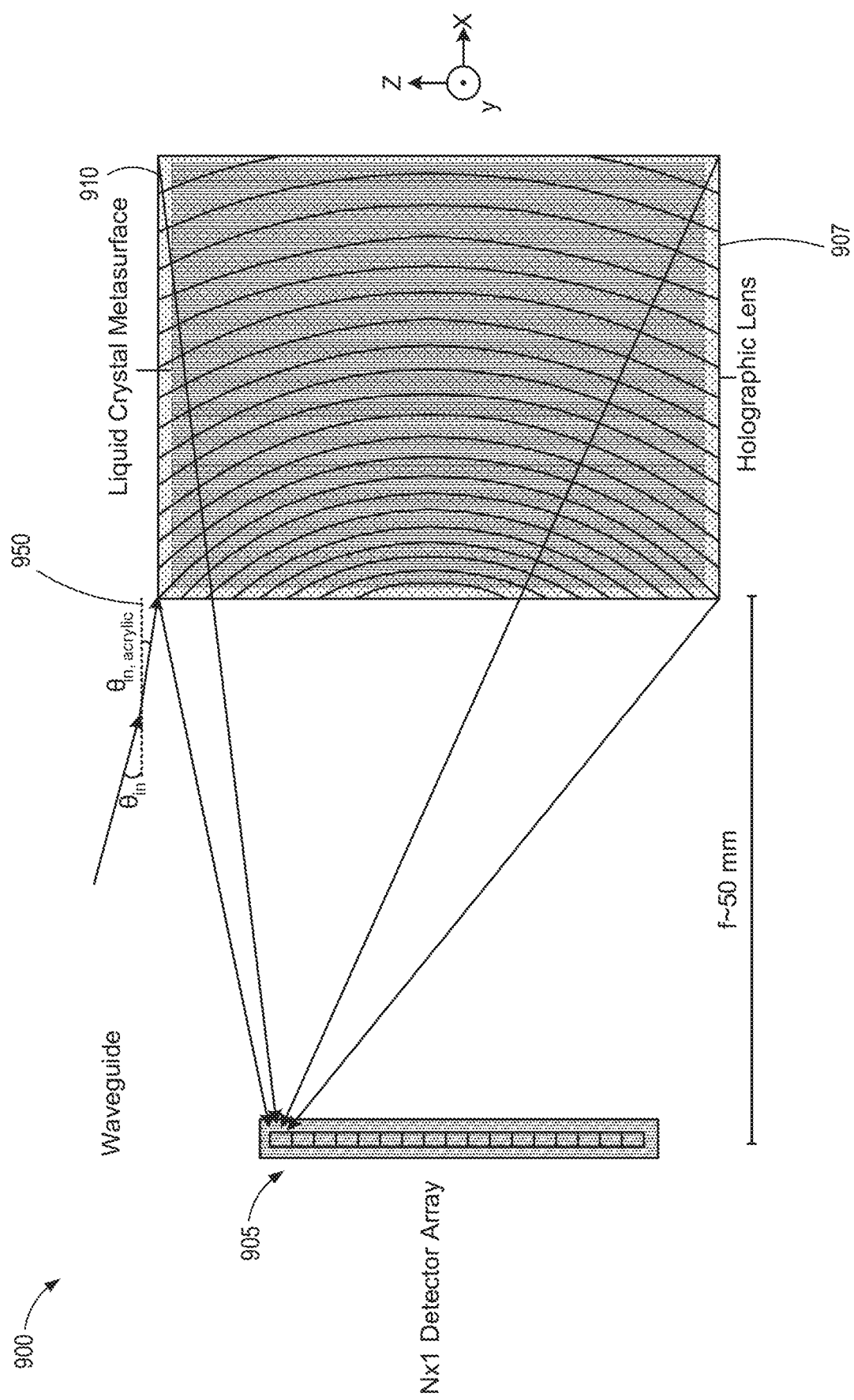
FIG. 9 illustrates a block diagram of a side view of an optical path of an optical waveguide tunable LCM receiver with a holographic lens between the LCM and the optical waveguide, according to one embodiment.

FIG. 9 illustrates a block diagram of a side view of an optical path of an optical waveguide tunable LCM receiver 900 with a holographic lens 907 between an optically reflective LCM 910 and the optical waveguide 950 coupling the optical radiation to the detector array 905, according to one embodiment. In the illustrated embodiment, the effective focal length between the output of the holographic lens 907 and the detector array 905 is approximately 50 mm. The optical waveguide 950 may comprise, for example, a glass or acrylic with a thickness selected to function as an optical waveguide for a selected frequency or bandwidth of frequencies.

Figure 10:
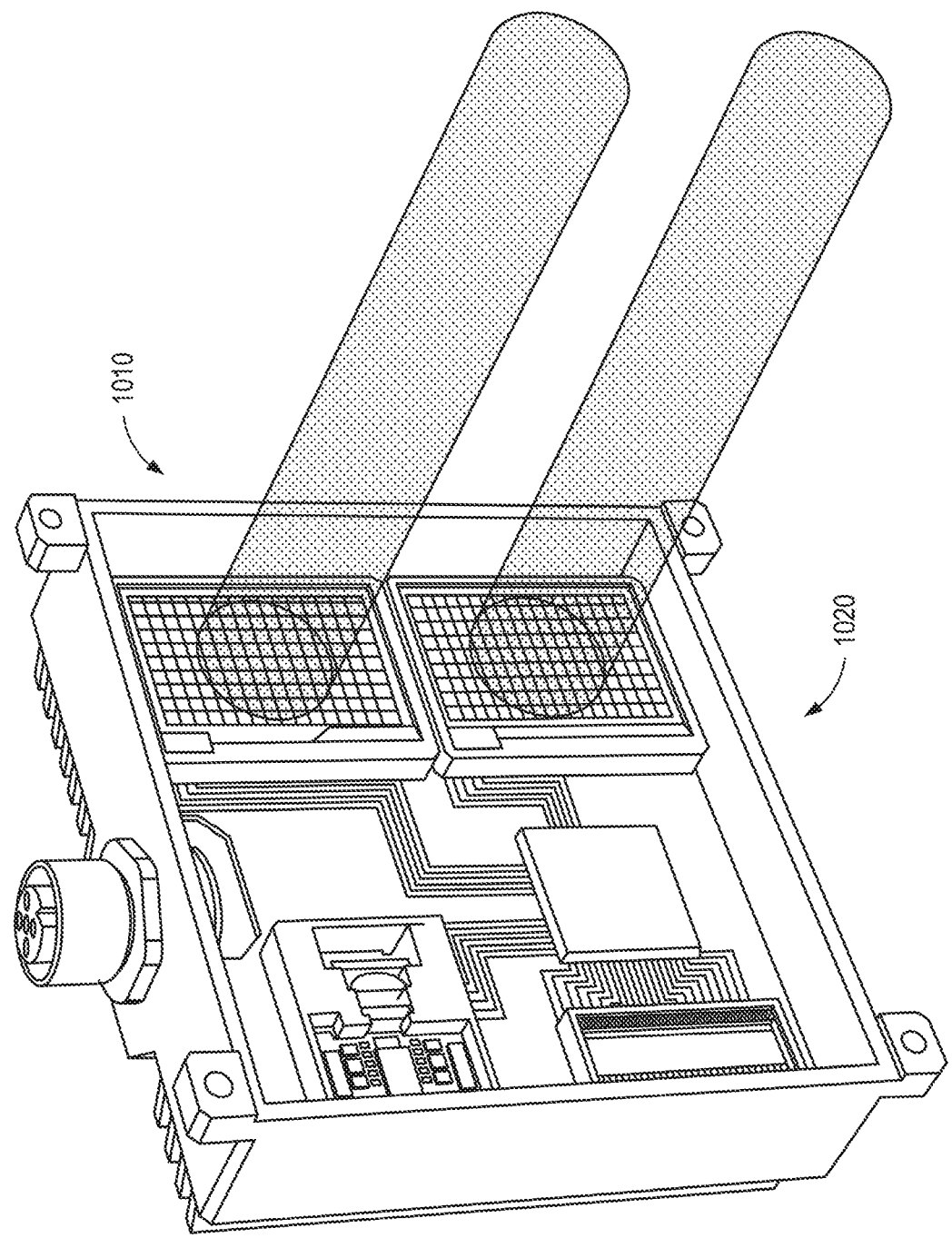
FIG. 10 illustrates a waveguide integrated transmit LCM and a waveguide integrated receive LCM of an optical waveguide-based solid-state LiDAR system, according to various embodiments.

FIG. 10 illustrates a waveguide integrated transmit LCM 1010 and a waveguide integrated receive LCM 1020 of an optical waveguide-based solid-state LiDAR system 1000, according to various embodiments or combinations thereof. In various embodiments, the receive LCM 1020 and the transmit LCM 1010 may share a common waveguide (e.g., a single, planar layer of acrylic, glass, or the like). The simplification and planar nature of the optical paths of the transmit and receive portions of the optical waveguide-based solid-state LiDAR system 1000 allows for a much thinner packaging profile than embodiments using the optical elements shown in, for example, FIG. 2.

This disclosure has been made with reference to various exemplary embodiments, including the best mode. However, those skilled in the art will recognize that changes and modifications may be made to the exemplary embodiments without departing from the scope of the present disclosure. While the principles of this disclosure have been shown in various embodiments, many modifications of structure, arrangements, proportions, elements, materials, and components may be adapted for a specific environment and/or operating requirements without departing from the principles and scope of this disclosure. These and other changes or modifications are intended to be included within the scope of the present disclosure.

This disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element. This disclosure should, therefore, be determined to encompass at least the following claims.

What is claimed is:

1. A solid-state light detection and ranging (LiDAR) transceiver system, comprising:
a first tunable, optically reflective liquid crystal metasurface (LCM) to steerably reflect optical radiation generated by a light source to a target location;
a transmit optical waveguide to convey the optical radiation generated by the light source to the first LCM;
a second tunable, optically reflective LCM to steerably receive optical radiation rebounded from the target location;
a receive optical waveguide to convey optical radiation from the second LCM to a sensor; and
a receiver holographic lens positioned between the second LCM and the receive optical waveguide that:
for optical radiation rebounded from the target location, corresponding to a first range of angles of incidence, passes the rebounded optical radiation through the holographic lens to the second LCM, and
for the rebounded optical radiation reflected by the second LCM, corresponding to a second range of angles of incidence, steers the reflected, rebounded optical radiation for total internal reflection (TIR)

within the receive optical waveguide for conveyance by the receive optical waveguide to the sensor.

2. The system of claim 1, wherein each of the first and second optically reflective LCMs comprises:
an array of optical resonant antennas arranged at sub-wavelength intervals on a reflective surface, and
liquid crystal positioned in optical field regions of each optical resonant antenna in the array.

3. The system of claim 2, further comprising a voltage controller to control the steering angles of the first and second optically reflective LCMs by selectively applying voltage differential bias patterns to the liquid crystal of the respective arrays of optical resonant antennas.

4. The system of claim 1, further comprising a transmitter holographic lens between the light source and the transmit optical waveguide to collimate the generated optical radiation for conveyance through the transmit optical waveguide to a transmit aperture of the first optically reflective LCM.

5. The system of claim 1, wherein the receiver holographic lens has an aperture corresponding in size to the aperture of the second optically reflective LCM.

6. The system of claim 1, wherein the receiver holographic lens is configured to modify the reflected rebounded optical radiation by at least one of:
collimating the reflected rebounded optical radiation for conveyance through the receive optical waveguide to a receive aperture of the sensor, and
spectrally filtering the reflected rebounded optical radiation to correspond to a bandwidth of the optical radiation generated by the light source.

7. The system of claim 1, wherein the transmit optical waveguide and the receive optical waveguide are portions of a single planar waveguide element.

8. The system of claim 1, wherein the light source comprises a laser.

9. An optical transmitter, comprising:
a light source to generate optical radiation;
an optical waveguide to convey the optical radiation generated by the light source along a length of the optical waveguide;
an optically steerable device positioned relative to the optical waveguide to:
receive the optical radiation conveyed by the optical waveguide, and
steer the received optical radiation for transmission through the optical waveguide to a target location; and
a holographic lens positioned between the light source and the optical waveguide, the holographic lens operable to:
collimate the optical radiation generated by the light source, and
convey the optical radiation into the optical waveguide for total internal reflection (TIR) within the optical waveguide and conveyance of the optical radiation to an aperture of the optically steerable device.

10. The transmitter of claim 9, wherein the optically steerable device comprises a tunable, optically reflective liquid crystal metasurface (LCM), wherein the optically reflective LCM comprises:
an array of optical resonant antennas arranged at sub-wavelength intervals on a reflective surface, and
liquid crystal positioned in optical field regions of each optical resonant antenna in the array.

11. The transmitter of claim 10, further comprising a voltage controller to control the steering angles of the optically reflective LCMs by selectively applying voltage differential bias patterns to the liquid crystal of the respective arrays of optical resonant antennas.

12. The transmitter of claim 9, wherein the optically steerable device comprises an array of moveable microelectromechanical (MEM) devices.

13. An optical receiver, comprising:
an optically reflective liquid crystal metasurface (LCM) to steerably receive optical radiation from a target location and reflect the received optical radiation to a sensor;
an optical waveguide to convey optical radiation reflected by the optically steerable device to the sensor; and
a holographic lens positioned between the optical waveguide and the optically reflective LCM to:
for optical radiation from the target location, corresponding to a first range of angles of incidence, pass the optical radiation through the holographic lens to the optically reflective LCM, and
for the optical radiation reflected by the optically reflective LCM, corresponding to a second range of angles of incidence, steer the reflected optical radiation for total internal reflection (TIR) within the optical waveguide for conveyance by the optical waveguide to the sensor.

14. The receiver of claim 13, wherein the optically reflective LCM comprises:
an array of optical resonant antennas arranged at sub-wavelength intervals on a reflective surface, and
liquid crystal positioned in optical field regions of each optical resonant antenna in the array.

15. The receiver of claim 14, further comprising a voltage controller to control the steering angles of the optically reflective LCM by selectively applying voltage differential bias patterns to the liquid crystal of the respective arrays of optical resonant antennas.

16. The receiver of claim 13, wherein the holographic lens has an aperture corresponding in size to the aperture of the optically reflective LCM.

17. The receiver of claim 13, wherein the holographic lens is configured to modify the optical radiation reflected by the optically reflective LCM by spectrally filtering the reflected optical radiation to limit the bandwidth of the optical radiation conveyed through the optical waveguide to the sensor.

18. An optical transceiver, comprising:
a light source to generate optical radiation;
a first steerable optical device to steer the optical radiation generated by the light source to a target location;
a transmit optical waveguide to convey the optical radiation generated by the light source to the first steerable optical device;
collimating optics to collimate the optical radiation generated by the light source into the transmit optical waveguide for conveyance to the first steerable optical device;
a second steerable optical device to steerably receive rebounded optical radiation from the target location and reflect the received rebounded optical radiation to a sensor;
a receive optical waveguide to convey the rebounded optical radiation reflected by the second steerable optical device to the sensor; and
a holographic lens positioned coplanar with the receive optical waveguide and within the optical path at which the second steerable optical device receives the rebounded optical radiation, such that the received rebounded optical radiation passes through the holographic lens before being received by the second steerable optical device, the holographic lens operable to:
- for optical radiation rebounded from the target location, corresponding to a first range of angles of incidence, pass the rebounded optical radiation through the holographic lens to the second steerable optical device, and
- for the rebounded optical radiation reflected by the second steerable optical device, corresponding to a second range of angles of incidence, steer the reflected, rebounded optical radiation for total internal reflection (TIR) within the receive optical waveguide for conveyance by the receive optical waveguide to the sensor.

19. The transceiver of claim 18, wherein the first steerable optical device comprises a first tunable, optically reflective liquid crystal metasurface (LCM), and
wherein the second steerable optical device comprises a second tunable, optically reflective LCM, wherein each of the first and second optically reflective LCMs comprises:
- an array of optical resonant antennas arranged at sub-wavelength intervals on a reflective surface, and
- liquid crystal positioned in optical field regions of each optical resonant antenna in the array.

20. The transceiver of claim 19, further comprising a voltage controller to control the steering angles of the first and second optically reflective LCMs by selectively applying voltage differential bias patterns to the liquid crystal of the respective arrays of optical resonant antennas.

21. The transceiver of claim 18, wherein the receiver holographic lens is configured to modify the reflected rebounded optical radiation by spectrally filtering the reflected rebounded optical radiation to correspond to a bandwidth of optical radiation generated by the light source.

22. A solid-state light detection and ranging (LiDAR) transceiver system, comprising:
- a laser light source to generate optical radiation;
- a first tunable, optically reflective liquid crystal metasurface (LCM) to steerably reflect the optical radiation generated by the laser light source to a target location;
- a transmit optical waveguide to convey the optical radiation generated by the laser light source to the first tunable, optically reflective LCM;
- a second tunable, optically reflective LCM to steerably receive optical radiation rebounded from the target location;
- a receive optical waveguide to convey optical radiation from the second tunable, optically reflective LCM to a sensor; and
- a receiver holographic lens positioned coplanar with the receive optical waveguide and within the optical path at which the second tunable, optically reflective LCM receives the rebounded optical radiation, such that the received rebounded optical radiation passes through the holographic lens before being received by the second tunable, optically reflective LCM, the holographic lens operable to:
  - for optical radiation rebounded from the target location, corresponding to a first range of angles of incidence, pass the rebounded optical radiation through the holographic lens to be received by the second tunable, optically reflective LCM, and
  - for the rebounded optical radiation reflected by the second tunable, optically reflective LCM, corresponding to a second range of angles of incidence, steer the reflected, rebounded optical radiation for total internal reflection (TIR) within the receive optical waveguide for conveyance by the receive optical waveguide to the sensor.

* * * * *